(12) United States Patent
Prosser

(10) Patent No.: US 10,967,986 B2
(45) Date of Patent: Apr. 6, 2021

(54) POTENTIAL AIRCRAFT TRAJECTORY WIND EFFECT COMPUTATION

(71) Applicant: Gulfstream Aerospace Corporation, Savannah, GA (US)

(72) Inventor: Kevin Prosser, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 49 days.

(21) Appl. No.: 16/191,154

(22) Filed: Nov. 14, 2018

(65) Prior Publication Data

US 2019/0147754 A1  May 16, 2019

Related U.S. Application Data

(60) Provisional application No. 62/586,022, filed on Nov. 14, 2017.

(51) Int. Cl.
| | |
|---|---|
| *B64D 43/02* | (2006.01) |
| *B64D 31/00* | (2006.01) |
| *G07C 5/02* | (2006.01) |
| *G07C 5/08* | (2006.01) |
| *G06F 30/20* | (2020.01) |

(Continued)

(52) U.S. Cl.
CPC ............ *B64D 43/02* (2013.01); *B64D 31/00* (2013.01); *G01P 5/16* (2013.01); *G01W 1/00* (2013.01); *G06F 30/20* (2020.01); *G06N 5/046* (2013.01); *G07C 5/02* (2013.01); *G07C 5/08* (2013.01); *G08G 5/0034* (2013.01);

(Continued)

(58) Field of Classification Search
CPC ..... G05D 1/0204; G05D 1/046; G05D 1/0623
See application file for complete search history.

(56) References Cited

U.S. PATENT DOCUMENTS

| 5,056,027 A | 10/1991 | Kahler | |
|---|---|---|---|
| 6,600,991 B1 * | 7/2003 | Jardin | .................... G01C 21/00 342/26 R |

(Continued)

FOREIGN PATENT DOCUMENTS

WO      2016191320 A1   12/2016

OTHER PUBLICATIONS

International Bureau of WIPO, International Search Report and Written Opinion for Application No. PCT/US2018/061075, dated Feb. 7, 2019.

(Continued)

*Primary Examiner* — Kenneth J Malkowski
(74) *Attorney, Agent, or Firm* — LKGlobal | Lorenz & Kopf, LLP

(57) ABSTRACT

Systems, aircraft, and non-transitory media are provided. An avionics system for an aircraft includes a storage device and one or more data processors. The storage device stores instructions for monitoring an actual performance of the aircraft. The one or more data processors are configured to execute the instructions to: generate a lateral component and a longitudinal component of a measured moving air mass relative to the aircraft; generate a plurality of wind independent positions of the aircraft along a potential aircraft trajectory based on a prediction model; and generate a plurality of wind corrected positions of the aircraft based on the plurality of wind independent positions, on the lateral component, and on the longitudinal component.

6 Claims, 2 Drawing Sheets

(51) Int. Cl.
  *G01W 1/00* (2006.01)
  *G06N 5/04* (2006.01)
  *G08G 5/00* (2006.01)
  *G01P 5/16* (2006.01)
  *G06F 111/10* (2020.01)

(52) U.S. Cl.
  CPC ......... *G08G 5/0039* (2013.01); *G08G 5/0091* (2013.01); *G01W 2001/003* (2013.01); *G06F 2111/10* (2020.01)

(56) References Cited

U.S. PATENT DOCUMENTS

| | | |
|---|---|---|
| 2006/0089760 A1 | 4/2006 | Love et al. |
| 2009/0132104 A1 | 5/2009 | Rupnik et al. |
| 2010/0314487 A1 | 12/2010 | Boelitz et al. |
| 2011/0251740 A1 | 10/2011 | Gomez Ledesma et al. |
| 2012/0158220 A1 | 6/2012 | Accardo et al. |
| 2013/0026299 A1 | 1/2013 | Constans et al. |
| 2014/0330455 A1 | 11/2014 | McIntyre et al. |
| 2015/0364046 A1 | 12/2015 | Lissajoux et al. |
| 2016/0004255 A1 | 1/2016 | Moxon |
| 2016/0023776 A1 | 1/2016 | Ganguli et al. |
| 2016/0063867 A1 | 3/2016 | Zammit et al. |
| 2016/0178364 A1 | 6/2016 | Walter |
| 2018/0114452 A1* | 4/2018 | Salce .................. G08G 5/0091 |

OTHER PUBLICATIONS

International Bureau of WIPO, International Search Report and Written Opinion for Application No. PCT/US2018/061081, dated Feb. 15, 2019.

International Bureau of WIPO, International Search Report and Written Opinion for Application No. PCT/US2018/061090, dated Jan. 24, 2019.

* cited by examiner

POTENTIAL AIRCRAFT TRAJECTORY WIND EFFECT COMPUTATION

CROSS-REFERENCE TO RELATED APPLICATIONS

This application claims the benefit of U.S. Provisional Application No. 62/586,022 filed on Nov. 14, 2017. The disclosure of the above application is incorporated herein by reference.

TECHNICAL FIELD

The present disclosure generally relates to aircraft trajectory prediction, and more particularly relates to predicting a location of an aircraft along a potential trajectory with position offsets to account for wind effects.

BACKGROUND

Determining the forces acting on an aircraft during flight utilizes complex equations that require computationally intense trigonometric functions to calculate longitudinal and lateral forces from wind through which the aircraft is flying. Such complex equations would require very large computational capacity onboard an aircraft to predict potential aircraft performance and position for high resolution and/or multiple trajectory aircraft modeling.

Accordingly, it is desirable to provide methods, systems, and aircraft that provide accurate position information that accounts for wind while reducing the computational burden of the trigonometric functions. Furthermore, other desirable features and characteristics of the present disclosure will become apparent from the subsequent detailed description and the appended claims, taken in conjunction with the accompanying drawings and the foregoing technical field and background.

SUMMARY

Systems, aircraft, and non-transitory media are provided. In a first non-limiting example, an avionics system for an aircraft includes a storage device and one or more data processors. The storage device stores instructions for monitoring an actual performance of the aircraft. The one or more data processors are configured to execute the instructions to: generate a lateral component and a longitudinal component of a measured moving air mass relative to the aircraft; generate a plurality of wind independent positions of the aircraft along a potential aircraft trajectory based on a prediction model; and generate a plurality of wind corrected positions of the aircraft based on the plurality of wind independent positions, on the lateral component, and on the longitudinal component.

In a second non-limiting example, an aircraft includes a sensor system and an avionics system. The sensor system is configured to measure a magnitude and direction of a moving air mass. The avionics system includes a storage device for storing instructions and one or more data processors configured to execute the instructions to: measure the magnitude and direction of the moving air mass based on an output from the sensor system; generate a lateral component and a longitudinal component of a measured moving air mass relative to the aircraft; generate a plurality of wind independent positions of the aircraft along a potential aircraft trajectory based on a prediction model; and generate a plurality of wind corrected positions of the aircraft based on the plurality of wind independent positions, on the lateral component, and on the longitudinal component.

In a third non-limiting embodiment, a non-transitory computer readable storage medium has instructions that when executed cause one or more data processors to: generate a lateral component and a longitudinal component of a measured moving air mass relative to the aircraft; generate a plurality of wind independent positions of the aircraft along a potential aircraft trajectory based on a prediction model; and generate a plurality of wind corrected positions of the aircraft based on the plurality of wind independent positions, on the lateral component, and on the longitudinal component.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

Figure 1:
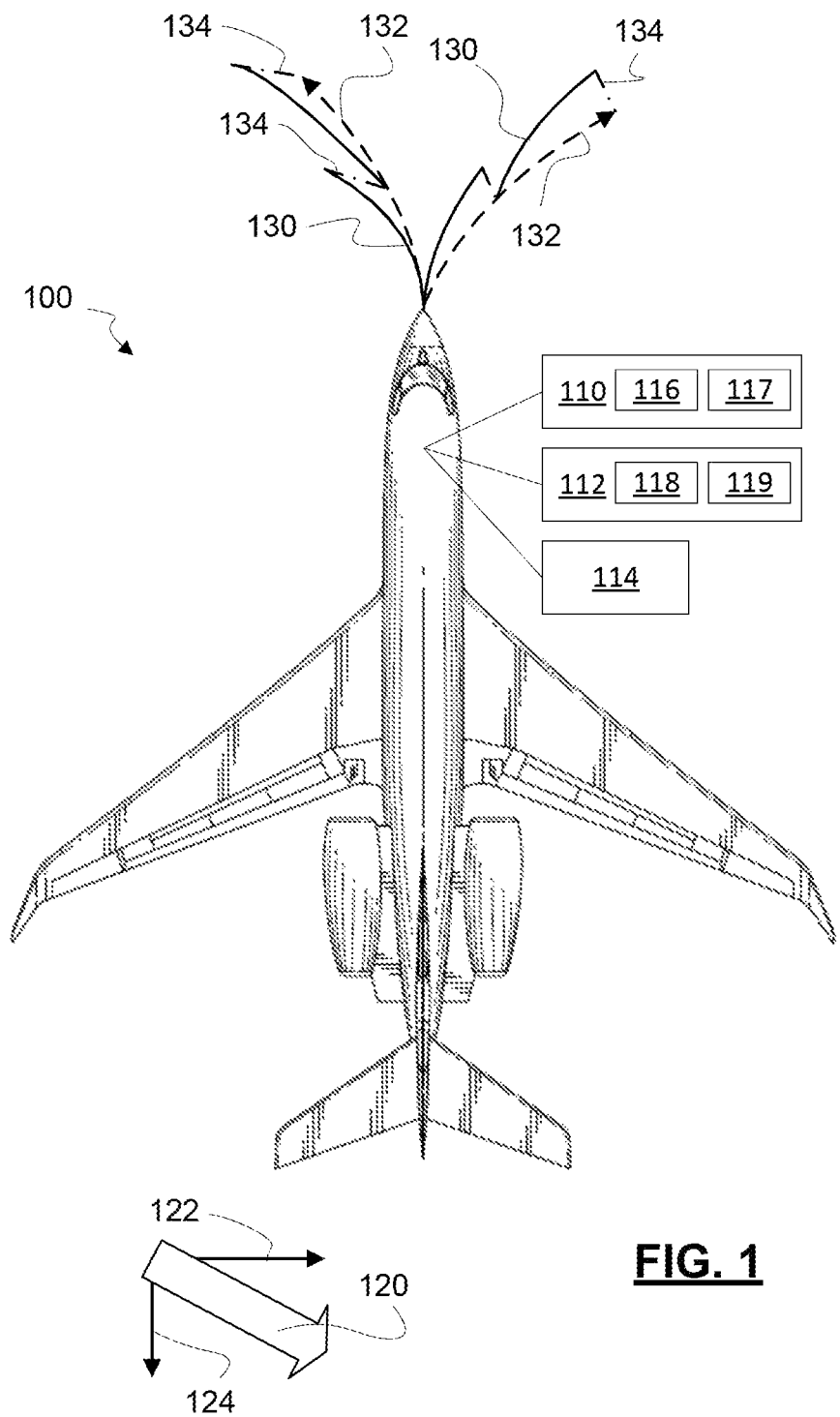
FIG. 1 is a schematic diagram illustrating an aircraft having a control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Various embodiments disclosed herein describe methods and systems for adjusting a potential aircraft trajectory for wind effects. In some examples, the trajectory model uses the potential trajectory systems described in U.S. patent application Ser. No. 15/470,776, filed Mar. 27, 2017, which is incorporated herein by reference.

Referring now to FIG. 1, an example of an aircraft 100 is illustrated in accordance with some embodiments. Aircraft 100 includes a control system 110, a sensor system 112, and an actuator system 114, among other systems. Although aircraft 100 is described in this description as an airplane, it should be appreciated that control system 110 may be utilized in other aircraft, land vehicles, water vehicles, space vehicles, or other machinery without departing from the scope of the present disclosure. For example, control system 110 may be utilized in submarines, helicopters, airships, spacecraft, or automobiles.

Aircraft 100 is acted on by moving air 120 (i.e., wind). Moving air 120 has a lateral component 122 and a longitudinal component 124. Lateral component 122 acts perpendicular to a longitudinal axis of aircraft 100 and longitudinal component 124 acts parallel to the longitudinal axis.

Control system 110 is an avionics system configured to operate aircraft 100 and to perform the methods described below to predict a wind independent potential flight path 130 and a wind adjusted potential flight path. Wind independent potential flight path 130 is adjusted by offsets 134 for wind position at iteration intervals of the trajectory modeling algorithm, as will be further discussed blow.

Control system 110 includes at least one processor 116 and a non-transitory computer readable storage device or medium 117. Non-transitory computer readable storage device or medium 117 is storage device for storing instructions for performing the method described below. At least one processor 116 is one or more data processors configured to execute the instructions to perform the method described below. The processor may be any custom made or commercially available processor, a central processing unit (CPU), a graphics processing unit (GPU), an auxiliary processor among several processors associated with control system 110, a semiconductor based microprocessor (in the form of a microchip or chip set), a macroprocessor, any combination thereof, or generally any device for executing instructions. The computer readable storage device or medium may include volatile and nonvolatile storage in read-only memory (ROM), random-access memory (RAM), and keep-alive memory (KAM), for example. The computer-readable storage device or medium may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 110 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals for actuator system 114 to automatically control the components of aircraft 100 based on the logic, calculations, methods, and/or algorithms. Although only one control system 110 is shown in FIG. 1, embodiments of aircraft 100 may include any number of control systems 110 that communicate over any suitable communication medium or a combination of communication media and that cooperate to process the sensor signals, perform logic, calculations, methods, and/or algorithms, and generate control signals to automatically control features of aircraft 100. In various embodiments, one or more instructions of control system, when executed by the processor, performs the methods described below.

Sensor system 112 includes one or more sensing devices that sense observable conditions of the exterior environment, the interior environment of aircraft 100, or operational conditions and status of aircraft 100. For example, sensor system 112 may include accelerometers, gyroscopes, RADARs, LIDARs, global positioning systems, optical cameras, thermal cameras, ultrasonic sensors, and/or other sensors. In the example provided, sensor system 112 includes a pitot static system with a pitot tube 118 and a static port 119. Signals from sensor system 112 may be used to determine a wind speed and direction of moving air 120, as will be appreciated by those with ordinary skill in the art.

Actuator system 114 includes one or more actuator devices that control one or more vehicle features. For example, actuator system 114 may include actuators that manipulate control surfaces on aircraft 100, extend or retract landing gear of aircraft 100, an/or move other components of aircraft 100.

Figure 2:
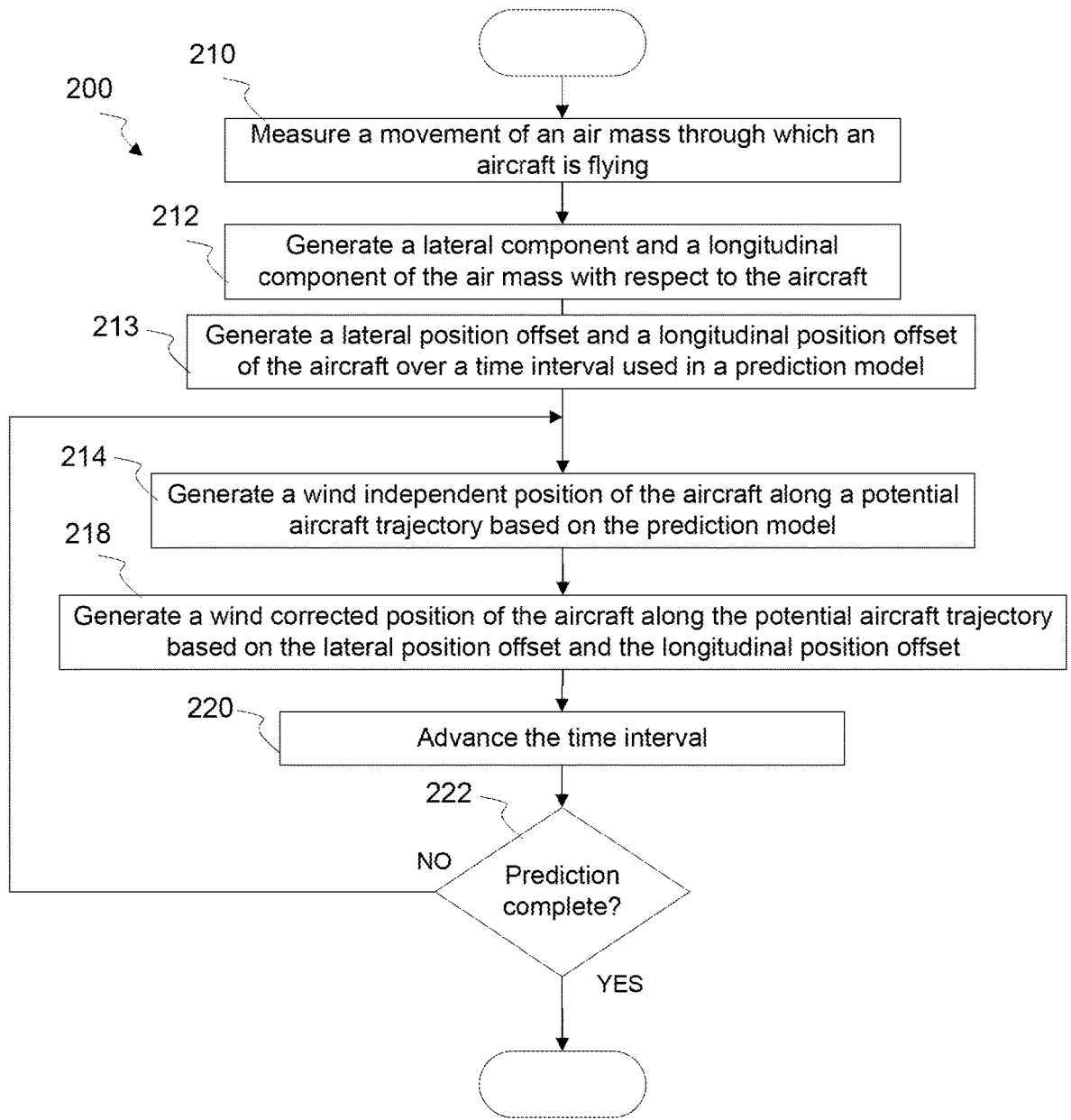
FIG. 2 is a flow chart illustrating a method for monitoring an actual aircraft performance, in accordance with various embodiments.

Referring now to FIG. 2, and with continued reference to FIG. 1, a method 200 for adjusting predicted trajectories for wind effects is illustrated in flow diagram form. In the example provided, control system 110 performs the tasks of method 200. For example, control system 110 may store instructions on storage device 117 for processor 116 to execute to perform the tasks of method 200. In some examples, method 200 adjust for wind effects in a hazard awareness system. For example, control system 110 may determine whether a potential aircraft trajectory complies with a flight envelope and avoids terrain based on the wind adjusted positions determined by control system 110.

Task 210 measures a movement of an air mass through which an aircraft is flying. For example, control system 110 may measure a speed and direction of moving air mass 120 using sensor system 112.

Task 212 generates a lateral component and a longitudinal component of the measured moving air mass relative to the aircraft. For example, control system 110 may use trigonometric functions to break moving air mass 120 into longitudinal component 124 and lateral component 122. In the example provided, longitudinal component 124 and lateral component 122 are taken with respect to axes of aircraft 100. In some examples, the lateral and longitudinal components may be taken with respect to a flight path of aircraft 100, with respect to the ground, or with respect to other features without departing from the scope of the present disclosure.

Task 213 generates a lateral position offset based on the lateral component and a longitudinal position offset based on the longitudinal component and a time interval of calculations used for the prediction model. In the example provided, control system 110 generates the lateral position offset according to:

$$\text{WindLat} = dt * \text{WindKnots} * \text{Math.Cos}(\text{WindHeading} * 0.0174533)/(3600*60); \quad (\text{eq. 1})$$

In eq. 1, Dt is the time interval, WindKnots is a speed of the moving air mass in knots, and WindHeading is a direction of the moving air mass in degrees (as opposed to the bearing source of the wind). It should be appreciated that other units (e.g., knots, mph, kph, degrees, radians) and sign conventions may be used without departing from the scope of the present disclosure.

Control system 110 generates the longitudinal position offset according to:

$$\text{WindLong} = dt * \text{WindKnots} * \text{Math.Sin}(\text{WindHeading} * 0.0174533)/(3600*60*\text{Math.Cos}(\text{Current-Latitude} * 0.0174533)) \quad (\text{eq. 2})$$

Task 214 generates a plurality of wind independent positions of the aircraft along a potential aircraft trajectory based on a prediction model. For example, control system 110 may execute the trajectory prediction model similar to the prediction model described in U.S. patent application Ser. No. 15/470,776, filed Mar. 27, 2017 without wind effect calculations at each interval to generate the plurality of wind independent positions. In the example provided, wind independent potential flight path 130 illustrates a path between wind independent positions.

Task 218 generates a plurality of wind corrected positions of the aircraft based on the plurality of wind independent positions, on the lateral component, and on the longitudinal component. In the example provided, control system 110 adds the lateral position offset and the longitudinal position offset to each of the plurality of wind independent positions to achieve offset 134. For example, wind independent potential flight path 130 adjusts and calculates the next time interval at the adjusted position corresponding to wind adjusted path 132.

Task 220 advances the time interval of the prediction model. Accordingly, control system 110 may generate a corresponding wind corrected position of the plurality of wind corrected positions at each time interval used in the prediction model.

Task 222 determines whether the prediction is complete. When the prediction is not complete, method 200 returns to task 214 to continue predicting the trajectory of aircraft 100 using the previously determined lateral position offset and longitudinal position offset. For example, control system 110 may generate a next consecutive position of the plurality of wind independent positions based on a current wind corrected position of the plurality of wind corrected positions at each time interval.

When the trajectory prediction is complete for all desirable trajectories, method 200 ends.

The various embodiments permit rapid computation of wind corrected potential aircraft trajectories. For example, instead of calculating the effect of wind at each increment along the trajectory, the wind effect may be calculated once and added to each subsequent position calculation. Because wind conditions at positions other than the current position are rarely known while in flight, the wind at the current position may be used to reduce the complexity of calculation and permit additional trajectory evaluation and/or shorter time intervals of evaluation for a given computational capacity. For example, the complex trigonometric mathematical computation can be performed once in such a way as to precompute the Latitude and Longitude shift that the wind will cause during each modeling increment. The shift can then be added to the future position using a simple addition without re-computing the sin/cosine for the wind angle for each iteration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An avionics system for an aircraft, the avionics system comprising:
   a storage device for storing instructions for monitoring an actual performance of the aircraft; and
   one or more data processors configured to execute the instructions to:
      generate a lateral component and a longitudinal component of a measured moving air mass relative to the aircraft;
      generate a plurality of wind independent positions of the aircraft along a potential aircraft trajectory based on a prediction model; and
      generate a plurality of wind corrected positions of the aircraft based on the plurality of wind independent positions, on the lateral component, and on the longitudinal component;
      generate a longitudinal position offset based on the longitudinal component and a lateral position offset based on the lateral component according to:
   WindLat=$dt$*WindKnots*Math.Cos(WindHeading*0.0174533)/(3600*60), where Dt is the time interval, WindKnots is a speed of the moving air mass in knots, and WindHeading is a direction of the moving air mass in degrees;
      generate the lateral position offset and the longitudinal position offset further based on a time interval of calculations used for the prediction model;
      offset each of the plurality of wind independent positions to generate a corresponding wind corrected position of the plurality of wind corrected positions at each time interval used in the prediction model;
      generate a next consecutive position of the plurality of wind independent positions based on a current wind corrected position of the plurality of wind corrected positions at each time interval.

2. The avionics system of claim 1, wherein the one or more data processors are further configured to execute the instructions to generate the plurality of wind independent positions by adding the lateral position offset and the longitudinal position offset to each of the plurality of wind independent positions.

3. An avionics system for an aircraft, the avionics system comprising:
   a storage device for storing instructions for monitoring an actual performance of the aircraft; and
   one or more data processors configured to execute the instructions to:
      generate a lateral component and a longitudinal component of a measured moving air mass relative to the aircraft;
      generate a lateral position offset based on the lateral component and a longitudinal position offset based on the longitudinal component according to:

WindLong=$dt$*WindKnots*Math.Sin(WindHeading*0.0174533)/(3600*60*Math.Cos(CurrentLatitude*0.0174533)), where Dt is the time interval, WindKnots is a speed of the moving air mass in knots, and WindHeading is a direction of the moving air mass in degrees;
      generate a plurality of wind independent positions of the aircraft along a potential aircraft trajectory based on a prediction model; and
      generate a plurality of wind corrected positions of the aircraft based on the plurality of wind independent positions, on the lateral component, and on the longitudinal component.

4. An aircraft comprising:
   a sensor system configured to measure a magnitude and direction of a moving air mass; and
   an avionics system comprising a storage device for storing instructions and one or more data processors configured to execute the instructions to:
      measure the magnitude and direction of the moving air mass based on an output from the sensor system;
      generate a lateral component and a longitudinal component of a measured moving air mass relative to the aircraft;
      generate a plurality of wind independent positions of the aircraft along a potential aircraft trajectory based on a prediction model;
      generate a longitudinal position offset based on the longitudinal component and a lateral position offset based on the lateral component according to:
   WindLat=$dt$*WindKnots*Math.Cos(WindHeading*0.0174533)/(3600*60); where Dt is the time interval, WindKnots is a speed of the moving air mass in knots, and WindHeading is a direction of the moving air mass in degrees; and
      generate a plurality of wind corrected positions of the aircraft based on the plurality of wind independent positions, on the lateral component, and on the longitudinal component.

5. An aircraft comprising:
   a sensor system configured to measure a magnitude and direction of a moving air mass; and
   an avionics system comprising a storage device for storing instructions and one or more data processors configured to execute the instructions to:
      measure the magnitude and direction of the moving air mass based on an output from the sensor system;
      generate a lateral component and a longitudinal component of a measured moving air mass relative to the aircraft;
      generate a plurality of wind independent positions of the aircraft along a potential aircraft trajectory based on a prediction model;
      generate a longitudinal position offset based on the longitudinal component and a lateral position offset based on the lateral component according to:

WindLong=$dt$*WindKnots*Math.Sin(WindHeading*0.0174533)/(3600*60*Math.Cos(CurrentLatitude*0.0174533))

where Dt is the time interval, WindKnots is a speed of the moving air mass in knots, and WindHeading is a direction of the moving air mass in degrees;
      generate the lateral position offset and the longitudinal position offset based on a time interval of calculations used for the prediction model; and
      generate a plurality of wind corrected positions of the aircraft based on the plurality of wind independent positions, on the lateral component, and on the longitudinal component by offsetting each of the plurality of wind independent positions to generate a corresponding wind corrected position of the plurality of wind corrected positions at each time interval used in the prediction model.

6. The aircraft of claim 5, wherein the one or more data processors are further configured to execute the instructions to add the lateral position offset and the longitudinal position offset to each of the plurality of wind independent positions.

* * * * *